United States Patent
Green et al.

(10) Patent No.: US 12,092,219 B2
(45) Date of Patent: Sep. 17, 2024

(54) MECHANICAL SEAL ASSEMBLY WITH PILOT REGISTER FOR ALIGNMENT

(71) Applicant: FSI NORTH AMERICA, INC., Coraopolis, PA (US)

(72) Inventors: Eric Green, Point Blank, TX (US); William Haywood, Monongahela, PA (US)

(73) Assignee: FSI North America, Inc., Coraopolis, PA (US)

( * ) Notice: Subject to any disclaimer, the term of this patent is extended or adjusted under 35 U.S.C. 154(b) by 0 days.

(21) Appl. No.: 18/329,835

(22) Filed: Jun. 6, 2023

(65) Prior Publication Data

US 2024/0209947 A1  Jun. 27, 2024

Related U.S. Application Data

(60) Provisional application No. 63/476,964, filed on Dec. 23, 2022.

(51) Int. Cl.
*F16J 15/34* (2006.01)

(52) U.S. Cl.
CPC .................. *F16J 15/3472* (2013.01)

(58) Field of Classification Search
CPC ...... F16J 15/3472; F16J 15/34; F16J 15/3464; F16J 15/348
See application file for complete search history.

(56) References Cited

U.S. PATENT DOCUMENTS

| | | | |
|---|---|---|---|
| 3,877,706 A | 4/1975 | Haas et al. | |
| 4,538,820 A | 9/1985 | Duffee | |
| 4,576,384 A | 3/1986 | Azibert | |
| 4,872,689 A | 10/1989 | Drumm | |
| 4,971,337 A * | 11/1990 | Hufford | F16J 15/3464 277/390 |
| 5,026,077 A * | 6/1991 | Warner | F16J 15/3464 277/390 |
| 5,114,163 A | 5/1992 | Radosav et al. | |
| 5,116,066 A | 5/1992 | Crawford | |
| 5,275,421 A | 1/1994 | Hornsby | |
| 5,344,164 A * | 9/1994 | Carmody | F16J 15/3472 277/393 |
| 5,356,158 A | 10/1994 | Simmons et al. | |
| 5,370,401 A | 12/1994 | Sandgren | |
| 5,490,682 A | 2/1996 | Radosav et al. | |

(Continued)

FOREIGN PATENT DOCUMENTS

EP  0345944 A2 * 12/1989

*Primary Examiner* — Gilbert Y Lee
(74) *Attorney, Agent, or Firm* — McNees Wallace & Nurick

(57) ABSTRACT

A mechanical seal of the cartridge type. A rotary subassembly including a sleeve, the sleeve packed against and adapted to be in sealing disposition with a pump shaft of a pump; a stationary subassembly for attachment to a stuffing box of the pump, the stationary subassembly including a gland, wherein the gland has a front face and back face; and, a register defined within the gland front face, the register being an opening shaped to fit over a raised face of the stuffing box, thereby limiting side loading of the seal. In addition, a composite setting piece press-fitted into a bore between the bushing section and the drive collar, thereby allowing the seal to be preset in lieu of a screw or clip.

18 Claims, 4 Drawing Sheets

(56) References Cited

U.S. PATENT DOCUMENTS

| | | |
|---|---|---|
| 5,662,340 A | 9/1997 | Bessett et al. |
| 5,716,054 A | 2/1998 | Duffee et al. |
| 5,863,047 A | 1/1999 | Ellis |
| 5,961,122 A | 10/1999 | Marsi |
| 6,017,036 A | 1/2000 | Murphy |
| 6,412,784 B1 | 7/2002 | Cohen |
| 6,485,024 B1 | 11/2002 | Pippert et al. |
| 6,557,856 B1 | 5/2003 | Azibert et al. |
| 7,607,884 B2 | 10/2009 | Cohen |
| 8,651,494 B2 | 2/2014 | Dudele |
| 9,617,994 B2 | 4/2017 | Walters et al. |
| 9,651,157 B2 | 5/2017 | Dudele |
| 9,841,016 B2 | 12/2017 | Goncalves |

\* cited by examiner

SECTION A-A

MECHANICAL SEAL ASSEMBLY WITH PILOT REGISTER FOR ALIGNMENT

CROSS REFERENCE TO RELATED APPLICATIONS

The present application claims benefit of provisional application Ser. No. 63/476,964, filed Dec. 23, 2022.

BACKGROUND OF THE INVENTION

Field of the Invention

The instant invention relates to mechanical seals of the cartridge type, and particularly to cartridge seals which have setting features.

Description of the Related Art

Mechanical seals are well known in the field to provide fluid seals between mating surfaces of pumps and other industrial equipment which typically require lubrication. Mechanical seals are therefore subject to wear and corrosion over time. As such, they require replacement.

A cartridge mechanical seal is a completely enclosed seal system with preassembled components. Typically, this seal type is composed of a gland, sleeve, and other hardware that makes pre-assembly possible. In a typical, traditional installation, the sleeve is carefully slid over the shaft and pre-set using setting clips to aid in axial and radial alignment. With or without an additional screw, the setting clips also serve to preload the two seal faces against one another. The screw is then tightened to supplement the placement, but this setting screw must be removed. The gland is installed to the seal chamber using equal and opposite tightening technique of setting screws, which locks the collar to sleeve (trans-axial force), the assemblies now being locked to the shaft for rotation therewith. The setting clips are then also removed. If the setting clips are slid up on the gland, they can potentially fall back down to the sleeve or drive collar. In some instances, installers may also forget to remove the metal setting screws. Failure to have and implement a required mechanical seal installation procedure has been a principal cause of danger and low mechanical seal life.

Seal assemblies have been developed which allow the setting clips to be expendable. U.S. Pat. No. 5,863,047 to Ellis teaches expendable clips that serve to preload the seal faces against one another, then can be selectively removed or, being made of plastic, can simply wear then break off over time. The concern of use of expendable clips, by themselves, is that the seal can move slightly on the face of the stuffing box or other pump casing. This is made worse for embodiments where any type of setting clip is omitted as part of the design. In most instances, these seals still also require a pre-set using various clips.

There is need then for a cartridge seal which can utilize the pump components (e.g., seal chamber and shaft) to ensure all seal components are running perpendicular to the centerline of the pump shaft, in the absence of supplementary setting components. This avoids side loading of the non-metallic setting devices and failure at start-up. By eliminating side loading, misalignment of the internal components of the seal is avoided and by allowing the seal to be aligned without ancillary installation hardware, danger is reduced and seal life is enhanced.

SUMMARY OF THE INVENTION

The instant seal comprehends a cartridge seal preset by a Teflon setting device. Further, a pilot register is defined in the gland further with a recessed gland gasket, the register fitting over a raised face on the stuffing box, thereby limiting side loading. Relied on is the seal chamber face outer diameter (O.D.) to locate the seal gland and maintain its position throughout the installation, thereby aiding in setting.

More particularly, comprehended is a mechanical seal, comprising: a rotary subassembly, the rotary subassembly including a sleeve, the sleeve packed against and adapted to be in sealing disposition with a pump shaft of a pump; a stationary subassembly for attachment to a stuffing box of the pump, the stationary subassembly including a gland, wherein the gland has a front face and back face; and, a register defined within the gland front face, the register being an opening shaped to fit over a raised face of the stuffing box, thereby limiting side loading of the seal. In addition, a composite setting piece press-fitted into a bore between the bushing section and the drive collar, thereby allowing the seal to be preset in lieu of a screw or clip.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Referencing then FIGS. 1-4, shown is the instant seal 1a of the cartridge type.

Figure 1:
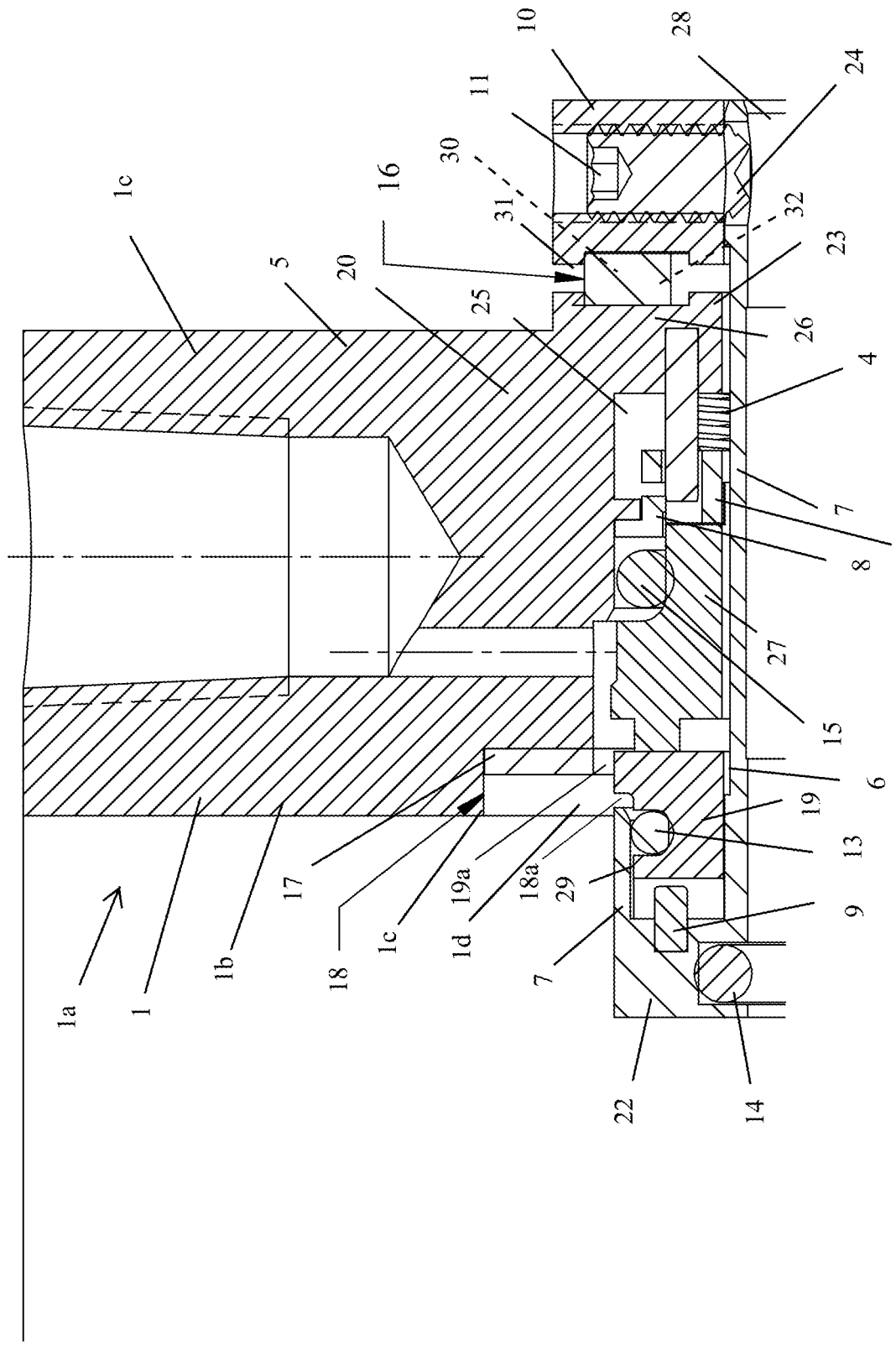
FIG. 1 shows a partial, cross-sectional view through the vertical plane of the instant seal in its position above the shaft (through an x-y plane).
Figure 2:
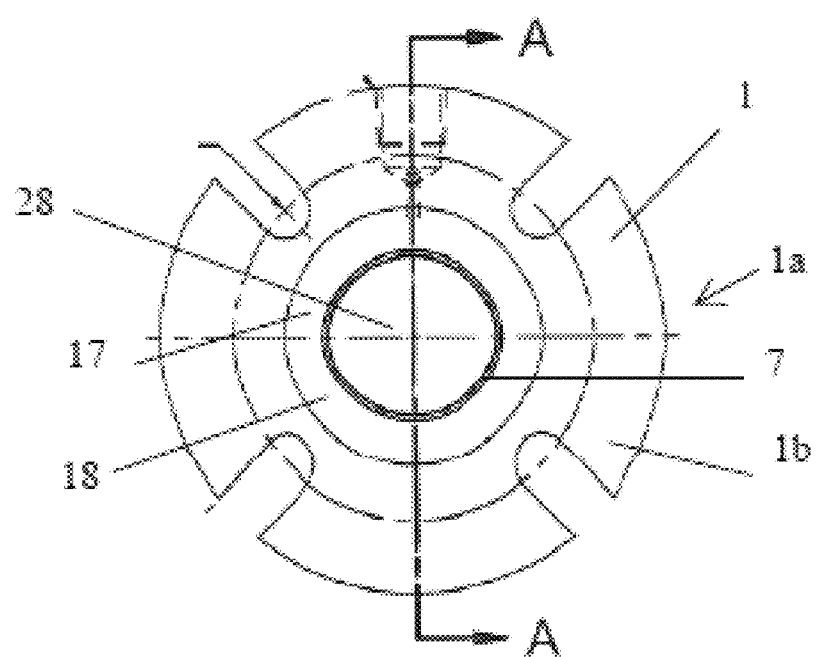
FIG. 2 shows an axial, down-shaft view (in z-y plane) in elevation of the instant seal.
Figure 3:
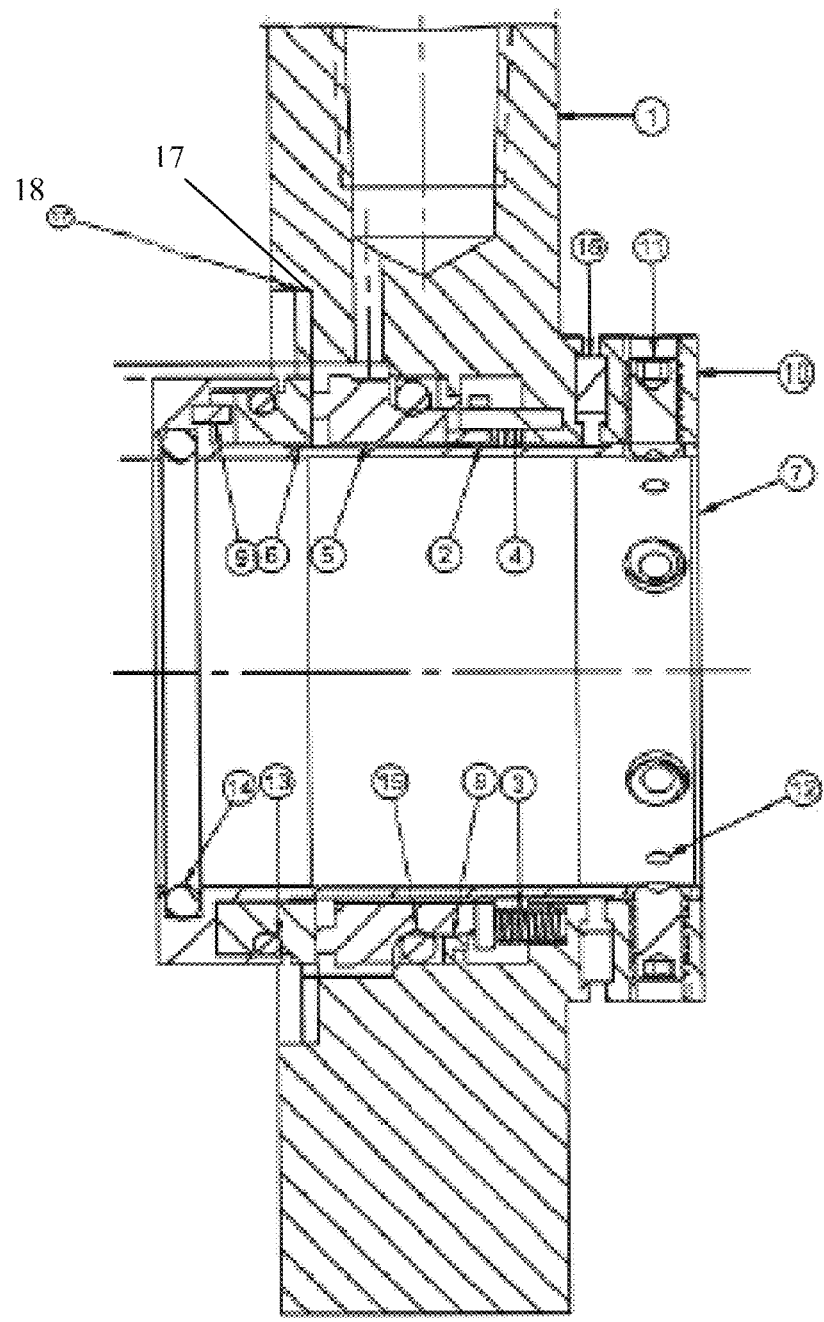
FIG. 3 shows a cross-sectional view of the entire seal through section A-A of FIG. 2 in its position along the shaft (through an x-y plane).
Figure 4:
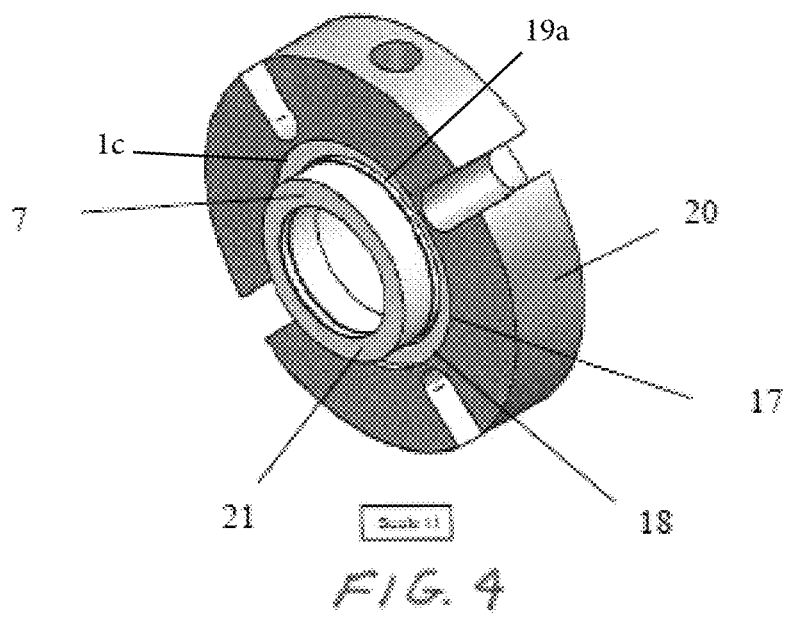
FIG. 4 shows a perspective view of the instant seal.

FIG. 1 shows a partial view of the seal 1a in that the cross-section is for one-half of the entire seal 1a assembly, it being understood that the seal 1a encircles the entire shaft 28, the bottom half of seal 1a not shown here but in FIG. 3. Accordingly, "a" as used in the claims means one or more where appropriate. When referenced, 'x' is the axis through shaft 28, the cross-sectional view here in FIG. 1 being thus the x-y plane.

Rotary subassembly 21 is the rotating component of seal 1a with pump shaft 28 running against stationary subassembly 20. Rotary subassembly 21 has a downshaft end 22 including end pin 9 and an upshaft end 23 relative to the location of the stuffing box or pump casing, i.e. traveling downshaft means past pump casing into pump. "Stuffing box" means the gland package but may also mean any general casing that would have a packing cavity or box to house the gland 1. L-seat annular 19 is formed at downshaft end 22 to provide sealing face 29, which is the flat surface of the rotary subassembly 21 which runs against and thereby forms a seal or barrier between rotary subassembly 21 and stationary subassembly 20 as is known in the art.

Rotary subassembly 21 includes a sleeve 7 as a mating ring packed against and underlying the L-seat annular 6 adapted to be in sealing disposition with the pump shaft 28. An outer surface along sleeve 7 forms part of the boundary of inner seal cavity 25. To aid in the seal, a primary o-ring 14 is inverted within the sleeve 7 as shown. "Inverted" means along the shaft-facing side of sleeve 7 such that the primary o-ring 14 is in sealing disposition between shaft 28 and rotary subassembly 21. A secondary o-ring 13 slightly upshaft from primary o-ring 14 is seated within L-seat annular 19 at sealing face 29. A spring 3 abuts stationary seal ring 27, preferably at bottom portion of gland 1, to thereby impart an axial load against the sealing face 29 in the absence of hydraulic pressure from the pump fluid. A thrust disk 2 supports the fluid load, disposed between stationary seal ring 27 and bushing section 26 of gland 1. Gland pin 4 is a coupling member for the thrust disk 2 and bushing section 26.

The stationary subassembly 20 is for attachment to the stuffing box or casing of the pump (not shown). Stationary subassembly 20 includes gland 1, which is essentially a gland plate having a front face 1*b* and a back face 1*c*. Stationary subassembly 20 defines inner seal cavity 25 sealed in part by tertiary o-ring 15 disposed between the back face 1*c* of gland 1 and stationary seal ring 27 of gland 1. Stationary seal ring 27 has stationary face sealing against sleeve 7 as shown. Back up ring 8 is adjacent to tertiary o-ring 15 to aid in sealing off inner seal cavity 25, especially upon wear of tertiary o-ring 15. Back-up ring 8 is separate from thrust disk 2 with the thrust disk 2 disposed below the back-up ring 8.

Gland 1 is fastened to stuffing box and can be preset using locator screws 12. Critical here, a register 18 is defined within lower part of gland front face 1*b*, as shown. Front face 1*b* has an overhang 1*c* at the lower part. Register 18 defines an opening 1*d* shaped to fit over a raised face of stuffing box. Shown is the register 18 recessed into front face 1*b* of gland 1 to define the opening 1*d* below the overhang 1*c*. As shown, the opening 1*d* is in front of the gasket 17 underlying the overhang 1*c*. Note the clearance 18*a* is forward of the gasket 17 and thereby accessible from the opening 1*d*. The sleeve 7 and rotary subassembly 21 pass through the gland 1 so there is slight clearance 18*a* defined here on the inner diameter (ID) of the gland 1 within register 18. Upon engagement, the movement of seal 1 is limited, particularly along that front face 1*b* and thus limiting side loading. Moreover, gasket 17 is seated within register 18 to seal against stuffing box. Gasket 17 is held above step 19*a*, which is an integral raised portion on L-seat annular 19, adjacent to register 18, i.e. formed within the same recess. This static gasket 17 keeps process fluid from migrating past the sleeve 7 to atmosphere.

Drive collar 10 is at bushing section 26 of gland plate 1 at upshaft end 23 designed to fit around shaft 28, set by set screw 11. Downwardly disposed drive ring 24 (from drive collar 10) crimps circumferentially on to shaft 28. A composite setting piece 16, preferably TEFLON®, is snapped (i.e., press-fitted) into a bore 30 between bushing section 26 and drive collar 10. As shown, bore 30 has an upper hole 31 and a lower hole 32. The upper hole 31 has a diameter less than the lower hole 32. Setting piece 16 therefore, upon being pressed into bore 30, is held under the upper hole 31. Setting piece 16 can preset the seal 1*a* in lieu of a screw or clip, the elimination of which benefits installation dangers and seal wear. Drive collar 25 is configured to fit around shaft 28 and maintains the sealing relationship of sealing face 29 by, in part, prohibiting axial movement, pressing against spring 3 to impart the axial load.

In use, therefore, the instant seal 1 being preset by a Teflon setting piece 16 eliminates the need for the installer to remove clips or screws before operating the pump. Additionally, the register 18 prevents the seal gland 1 from contacting the sleeve 7 during startup and limits side loading. Other seal manufacturers do not standardly utilize the pump components themselves (seal chamber and shaft) in combination with the setting piece to ensure all seal components are running perpendicular to the centerline of the pump shaft 28. This leads to side loading of the non-metallic setting devices and failure at start-up. The instant design implements more of an API approach in that it relies on the seal chamber face O.D. to locate the seal gland and maintain its position throughout the installation. Side loading of the setting device is thereby eliminated, and thus the reduction of any risk of misalignment of the internal components of the seal.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A mechanical seal, comprising:
   a rotary subassembly, said rotary subassembly including a sleeve, said sleeve packed against and adapted to be in sealing disposition with a pump shaft of a pump;
   a stationary subassembly for attachment to a stuffing box of said pump, said stationary subassembly including a gland, wherein said gland has a front face and back face; a register defined within said gland front face below an overhang of said front face;
   a gasket recessed and seated within said register to seal against said stuffing box;
   wherein said register further defines an opening defined in front of said gasket underlying said overhang of said gland front face, said opening with said overhang shaped to fit over a raised face of said stuffing box, thereby limiting side loading of said seal.

2. The mechanical seal of claim 1, further comprising: said rotary subassembly having a downshaft end and an upshaft end relative to said stuffing box; and, an end pin at said downshaft end.

3. The mechanical seal of claim 2, further comprising: an L-seat annular formed at said downshaft end adjacent to said end pin, thereby providing a sealing face between said rotary subassembly and said stationary subassembly.

4. The mechanical seal of claim 3, further comprising a secondary o-ring seated within said L-seat annular at said sealing face.

5. The mechanical seal of claim 3, further comprising a step formed on said L-seat annular adjacent to said register.

6. The mechanical seal of claim 3, wherein a clearance is defined within said register on an inner diameter of said gland, said clearance defined between said sleeve and said L-seat annular forward of said gasket to thereby be accessible from said opening.

7. The mechanical seal of claim 1, further comprising a primary o-ring inverted within said sleeve in sealing disposition between said shaft and said rotary subassembly.

8. The mechanical seal of claim 1, wherein said stationary subassembly further comprises: a stationary seal ring, said stationary seal ring having a stationary sealing face sealing against said sleeve; a spring abutting said stationary seal ring to thereby impart an axial load against said stationary sealing face; and, a tertiary o-ring disposed between said back face of said gland plate and said stationary seal ring.

9. The mechanical seal of claim 8, further comprising: a back-up ring adjacent to said tertiary o-ring to aid in sealing off said inner seal cavity; and, a thrust disk separate from said back-up ring, said thrust disk disposed below said back-up ring and between said stationary seal ring and said bushing section.

10. A mechanical seal, comprising:
a rotary subassembly, said rotary subassembly including a sleeve, said sleeve packed against and adapted to be in sealing disposition with a pump shaft of a pump;
a stationary subassembly for attachment to a stuffing box of said pump, said stationary subassembly including a gland plate, wherein said gland plate includes a bushing section at an upshaft end thereof, and said gland plate includes a drive collar at said bushing section, said drive collar configured to fit around said shaft;
a bore defined between said bushing section and said drive collar, said bore having an upper hole and a lower hole, said upper hole having a diameter less than said lower hole;
a composite setting piece press-fitted into said bore held under said upper hole between said bushing section and said drive collar, thereby allowing said seal to be preset in lieu of a screw or clip.

11. The mechanical seal of claim 10, further comprising: said rotary subassembly having a downshaft end and an upshaft end relative to said stuffing box; and, an end pin at said downshaft end.

12. The mechanical seal of claim 11, further comprising: an L-seat annular formed at said downshaft end adjacent to said end pin, thereby providing a sealing face between said rotary subassembly and said stationary subassembly.

13. The mechanical seal of claim 12, further comprising a secondary o-ring seated within said L-seat annular at said sealing face.

14. The mechanical seal of claim 10, further comprising a primary o-ring inverted within said sleeve in sealing disposition between said shaft and said rotary subassembly.

15. The mechanical seal of claim 10, wherein said stationary subassembly further comprises: a stationary seal ring, said stationary seal ring having a stationary sealing face sealing against said sleeve; a spring abutting said stationary seal ring to thereby impart an axial load against said stationary sealing face; and, a tertiary o-ring disposed between said back face of said gland plate and said stationary seal ring.

16. The mechanical seal of claim 15, further comprising a back-up ring adjacent to said tertiary o-ring to aid in sealing off said inner seal cavity.

17. The mechanical seal of claim 15, further comprising a thrust disk disposed between said stationary seal ring and said bushing section.

18. The mechanical seal of claim 10, further comprising a drive ring downwardly disposed from said drive collar adapted to crimp circumferentially on to said shaft.

* * * * *